Patented Apr. 1, 1947

2,418,336

UNITED STATES PATENT OFFICE 2,418,336

TRIAZINE DERIVATIVES

Gaetano F. D'Alelio and James W. Underwood, Pittsfield, Mass., assignors to General Electric Company, a corporation of New York No Drawing. Application August 19, 1942, Serial No. 455,357

1 Claim. (Cl. 260—249.5)

This invention relates to new chemical compounds and more particularly to triazine derivatives. The invention especially is concerned with the production of new and useful acylhydrazino-substituted triazines.

The chemical compounds of this invention may be represented by the following general formula:

I

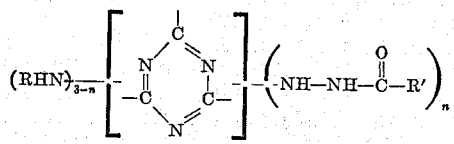

where $n$ represents an integer and is at least 1 and not more than 3, R represents a member of the class consisting of hydrogen and monovalent hydrocarbon and substituted hydrocarbon radicals, more particularly halo-hydrocarbon radicals, and R' represents a member of the class consisting of monovalent aliphatic hydrocarbon radicals and monovalent aromatic and nuclearly substituted, specifically nuclearly halogenated, aromatic hydrocarbon radicals. From the above formula it will be noted that when $n$ is 3 there will be no —NHR groups attached to the triazine nucleus.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R is hydrogen.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like. Preferably R' represents a lower alkyl radical or a phenyl radical.

The new compounds of this invention may be used, for example, as pharmaceuticals, plasticizers and as intermediates in the preparation of derivatives thereof, e. g., methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 455,356 filed concurrently herewith, now U. S. 2,392,366, issued January 8, 1946, and assigned to the same assignee as the present invention.

Various methods may be employed to produce the chemical compounds of this invention. One suitable method comprises effecting reaction, in the presence of a hydrohalide acceptor, between a triazine derivative corresponding to the general formula

II

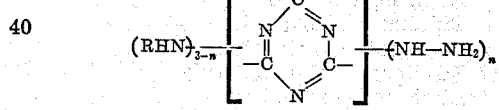

and an acyl halide corresponding to the general formula

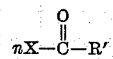

where X represents a halogen atom and $n$, R and R' have the same meanings as given above with reference to Formula I.

Illustrative examples of hydrazino-substituted triazines embraced by Formula II that may be employed, depending upon the particular end-product sought, are:

Hydrazino diamino s-triazine (2-hydrazino 4,6-diamino s-triazine; 4-hydrazino 2,6-diamino s-triazine; 6-hydrazino 2,4-diamino s-triazine)
2-hydrazino 4,6-di-(methylamino) s-triazine
2-hydrazino 4,6-di-(ethylamino) s-triazine
2-hydrazino 4-methylamino 6-amino s-triazine
2-hydrazino 4-ethylamino 6-amino s-triazine
2-hydrazino 4-methylamino 6-ethylamino s-triazine
2-hydrazino 4,6-di-(pentylamino) s-triazine
2-hydrazino 4,6-di-(isobutylamino) s-triazine
2-hydrazino 4,6-di-(propenylamino) s-triazine
2-hydrazino 4,6-di-(butenylamino) s-triazine
2-hydrazino 4,6-di-(phenylamino) s-trazine
2-hydrazino 4,6-di-(chlorophenylamino) s-triazine
2-hydrazino 4-anilino 6-amino s-triazine
2-hydrazino 4-anilino 6-methylamino s-triazine
2-hydrazino 4,6-ditoluido s-triazine
2-hydrazino 4,6-dixylidino s-triazine
2-hydrazino 4,6-di-(naphthylamino) s-triazine
2-hydrazino 4,6-di-(ethylphenylamino) s-triazine
2-hydrazino 4,6-di-(phenylethylamino) s-triazine
2-hydrazino 4,6-di-(cinnamylamino) s-triazine
2-hydrazino 4,6-di-(chloromethylamino) s-triazine
2-hydrazino 4,6-di-(bromoethylamino) s-triazine
2-hydrazino 4,6-di-(chloroanilino) s-triazine
2-hydrazino 4,6-di-(bromotoluido) s-triazine
Di-hydrazino amino s-triazine
Tri-hydrazino s-triazine
2,4-di-hydrazino 6-methylamino s-triazine
2,4-di-hydrazino 6-allylamino s-triazine
2,4-di-hydrazino 6-fluoroanilino s-triazine
2,4-di-hydrazino 6-iodoanilino s-triazine
2,4-di-hydrazino 6-cyclohexylamino s-triazine Illustrative examples of acyl halides that may be used, depending upon the desired end-product, are:

Acetyl chloride (ethanoyl chloride)
Acetyl bromide
Acetyl iodide
Propionyl chloride
Propionyl bromide
Butyryl chloride
Valeryl chloride
Isovaleryl chloride
Propenoyl chloride
Butenoyl chloride
Capryl chloride
Benzoyl chloride
Chlorobenzoyl chlorides
Benzoyl bromide
Toluyl chlorides
Naphthoyl chloride
Chloronaphthoyl chlorides
3-bromotoluyl chlorides
2,4-dibromotoluyl chlorides
Dimethylbenzoyl chlorides
Ethylbenzoyl chlorides
Propenylbenzoyl chlorides Various hydrohalide acceptors may be employed but we prefer to use a tertiary base, e. g., tertiary amines such as trialkyl (e. g., trimethyl, triethyl, tripropyl, tributyl, etc.) amines, triaryl (e. g., triphenyl, tritolyl, etc.) amines, pyridine, dimethyl aniline, etc. The reaction between the hydrazino-substituted triazine and the acyl halide may be carried out in any suitable manner, but preferably is effected in the presence of a suitable solvent or mixture of solvents. It is advisable to use an anhydrous medium, e. g., ether, benzene, toluene, etc., because of the high degree of reactivity of the acyl halide. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

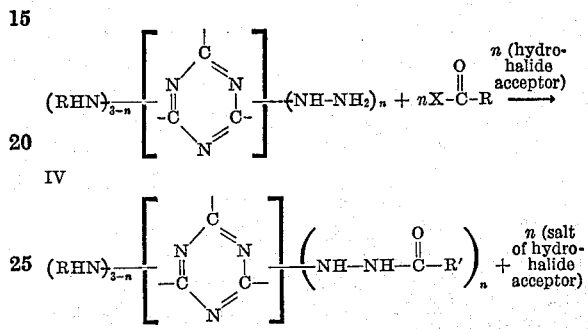

IV where X represents a halogen atom, and $n$, R and R' have the same meanings as given above with reference to Formula I.

Another method that is suitable for preparing many of the chemical compounds of this invention comprises effecting reaction between an anhydride, if available, of a carboxylic acid and a hydrazino-substituted triazine. In general, the acid anhydrides employed are the lower members of the homologous series, e. g., the anhydrides of acetic, propionic, butanoic, butenoic, isobutanoic, valeric, isovaleric, caproic, benzoic, chlorobenzoic, bromobenzoic, toluic, 1-naphthoic and 2-naphthoic acids. This reaction preferably is carried out in a suitable solvent or mixture of solvents, e. g., ether, benzene, toluene, etc. The reaction conditions may be the same as described above with reference to the use of an acyl halide as a starting reactant, but ordinarily normal temperature and pressure conditions are preferred. The reaction may be represented by the following general equation:

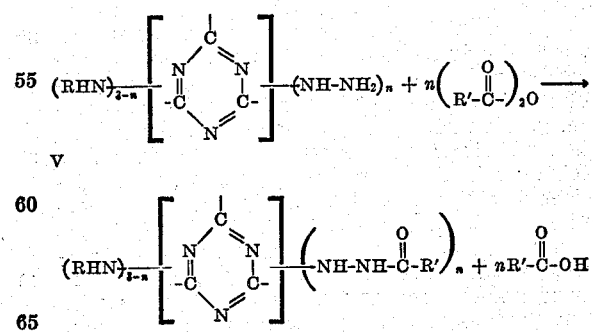

V where $n$, R and R' have the same meanings as given above with reference to Formula I.

Another method that may be employed in preparing the new chemical compounds of this invention comprises effecting reaction between a halogenated triazine and a hydrazide (acyl hydrazine). This reaction preferably is carried out in the presence of a suitable solvent or mixture of solvents. A hydrohalide acceptor also preferably is present. The reaction may be represented by the following general equation:

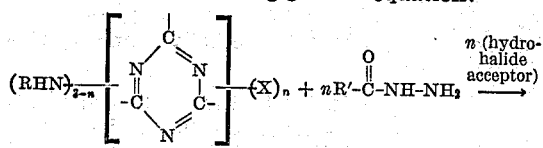

VI

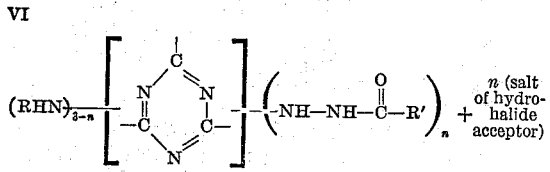

where X represents a halogen atom, and $n$, R and R' have the same meanings as given above with reference to Formula I. Preferably X is a chlorine or a bromine atom.

Another method that may be used in preparing compounds of this invention comprises effecting an addition reaction between (1) ketenes of the general formula $R'_2$—C=C=O, where R' has the same meaning as given above with reference to Formula I and, in addition, hydrogen, and (2) a hydrazino-substituted triazine. This reaction may be represented by the following general equation:

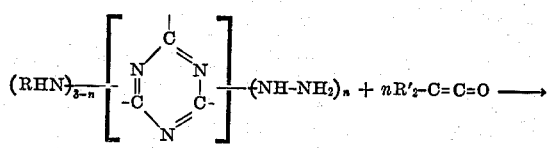

VII

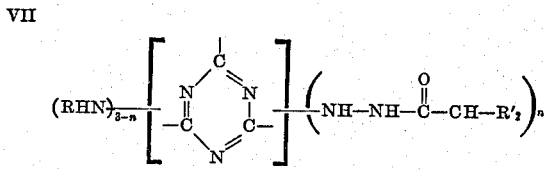

where $n$ and R have the same meanings as given above with reference to Formula I, and R' has the same meaning as given with reference to Formula I and, in addition, hydrogen.

In order that those skilled in the art better may understand how the present invention may be carried into effect, the following examples are given by way of illustration and not by way of limitation. All parts are by weight.

*Example 1*

This example illustrates the preparation of acetylhydrazino diamino s-triazine, the formula for which is

VIII

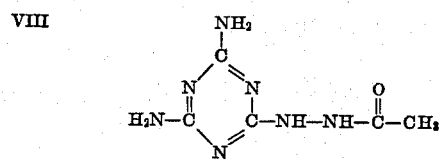

|  | Parts | Approx. mol ratio |
|---|---|---|
| Hydrazino diamino s-triazine | 100.0 | 1 |
| Acetic anhydride | 72.4 | 1 |
| Ether | 150.0 |  |

The acetic anhydride was added slowly to the mixture of the other components. An exothermic reaction took place. After the reaction had subsided, the reaction flask was stoppered and shaken for 6 hours at room temperature. After standing for about 16 hours at room temperature, the precipitate comprising acetylhydrazino diamino s-triazine was filtered off, washed well with water and dried. A yield of 124 parts of the purified material was obtained.

*Example 2*

Di-(acetylhydrazino) amino s-triazine is prepared in essentially the same manner as described under Example 1 with the exception that 110.6 parts of di-hydrazino amino s-triazine are used in place of 100 parts of hydrazino diamino s-triazine and the amount of acetic anhydride is increased from 72.4 to 144.8 parts. In other words, reaction is effected between di-hydrazino amino s-triazine and acetic anhydride in the ratio of one mol of the former to approximately two mols of the latter.

*Example 3*

Tri-(acetylhydrazino) s-triazine is prepared in essentially the same manner as described under Example 1 with the exception that 121.2 parts of tri-hydrazino s-triazine are used in place of 100 parts of hydrazino diamino s-triazine and the amount of acetic anhydride is increased from 72.4 to 217.2 parts. In other words, reaction is effected between tri-hydrazino s-triazine and acetic anhydride in the ratio of one mol of the former to approximately three mols of the latter.

*Example 4*

Acetylhydrazino di-(methylamino) s-triazine is prepared in essentially the same manner as described under Example 1 with the exception that 119.9 parts of hydrazino di-(methylamino) s-triazine are used in place of 100 parts of hydrazino diamino s-triazine.

*Example 5*

Propionylhydrazino diamino s-triazine is prepared in essentially the same manner as described under Example 1 with the exception that 92.3 parts of propionic anhydride are used instead of 72.4 parts of acetic anhydride.

Illustrative examples of other chemical compounds embraced by Formula I that may be produced in accordance with the present invention are listed below:

Acetylhydrazino di-(ethylamino) s-triazine
Propionylhydrazino di-(methylamino) s-triazine
Propenoylhydrazino diamino s-triazine
Di-(propionylhydrazino) amino s-triazine
Tri-(propionylhydrazino) s-triazine
Di-(propionylhydrazino) methylamino s-triazine
Acetylhydrazino di-(butylamino) s-triazine
Acetylhydrazino di-(propenylamino) s-triazine
Propionylhydrazino di-(cyclohexylamino) s-triazine
Acetylhydrazino dianilino s-triazine
Acetylhydrazino ditoluido s-triazine
Acetylhydrazino dixylidino s-triazine
Acetylhydrazino di-(phenethylamino) s-triazine
Di-(acetylhydrazino) anilino s-triazine
Di-(acetylhydrazino) toluido s-triazine
Di-(acetylhydrazino) xylidino s-triazine
Acetylhydrazino di-(ethylanilino) s-triazine
Acetylhydrazino di-(chloroanilino) s-triazine
Acetylhydrazino di-(benzylamino) s-triazine
2-acetylhydrazino 4-methylamino 6-amino s-triazine (4-acetylhydrazino 2-methylamino 6-amino s-triazine; 6-acetylhydrazino 2-methylamino 4-amino s-triazine)
2-acetylhydrazino 4-anilino 6-amino s-triazine 2-acetylhydrazino 4-anilino 6-methylamino s-triazine
Benzoylhydrazino diamino s-triazine
Chlorobenzoylhydrazino diamino s-triazine
Di-(benzoylhydrazino) amino s-triazine
Tri-(benzoylhydrazino) s-triazine
Toluylhydrazino diamino s-triazine
Di-(toluylhydrazino) amino s-triazine
Tri-(toluylhydrazino) s-triazine
Dimethylbenzoylhydrazino diamino s-triazine
Chlorobenzoylhydrazino di-(chloroethylamino) s-triazine
Di-(benzoylhydrazino) methylamino s-triazine
Di-(acetylhydrazino) benzoylhydrazino s-triazine
Di-(acetylhydrazino) propionylhydrazino s-triazine
2-acetylhydrazino 4 - benzoylhydrazino 6 - propionylhydrazino s-triazine
Acetylhydrazino di-(fluoroanilino) s-triazine
Propionylhydrazino di-(iodoanilino) s-triazine
Benzoylhydrazino di-(bromotoluido) s-triazine
Bromobenzoylhydrazino di - (bromoanilino) s - triazine
Acetylhydrazino di-(chlorotoluido) s-triazine
Acetylhydrazino di-(cyclohexylamino) s-triazine
Acetylhydrazino di-(octylamino) s-triazine
Acetylhydrazino di-(cyclohexenylamino) s-triazine
Acetylhydrazino di-(allylamino) s-triazine
Di-propionylhydrazino) methallylamino s-triazine In a manner similar to that described above with particular reference to the production of the hydrazino-substituted 1,3,5- or symmetrical triazines (s-triazines), corresponding derivatives of the asymmetrical triazines and of the vicinal triazines may be prepared.

What we claim as new and desire to secure by Letters Patent of the United States is:

The method of preparing acetylhydrazino diamino s-triazine which comprises effecting reaction in liquid state and in the absence of applied heat between hydrazino diamino s-triazine and acetic anhydride in approximately equimolecular proportions, allowing the reaction mass to remain undisturbed at room temperature and isolating and purifying the precipitate comprising acetylhydrazino diamino s-triazine.

GAETANO F. D'ALELIO.
JAMES W. UNDERWOOD.